(12) United States Patent
Sandstrom et al.

(10) Patent No.: US 7,533,707 B2
(45) Date of Patent: May 19, 2009

(54) TWO-PIECE TIRE

(75) Inventors: Paul Harry Sandstrom, Cuyahoga Falls, OH (US); Thomas Joseph Segatta, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 115 days.

(21) Appl. No.: 11/711,330

(22) Filed: Feb. 27, 2007

(65) Prior Publication Data

US 2007/0187012 A1    Aug. 16, 2007

Related U.S. Application Data

(62) Division of application No. 11/020,889, filed on Dec. 22, 2004, now Pat. No. 7,207,366.

(51) Int. Cl.
  *B60C 1/00* (2006.01)
  *B60C 9/00* (2006.01)
  *B60C 9/02* (2006.01)

(52) U.S. Cl. .................. 152/548; 152/450; 152/564

(58) Field of Classification Search ............ 152/209.5, 152/905, 170, 185, 209.1, 548, 564, 450
  See application file for complete search history.

(56) References Cited

U.S. PATENT DOCUMENTS

| | | | |
|---|---|---|---|
| 2,224,141 A | 12/1940 | Clark | 152/209 |
| 5,106,896 A | 4/1992 | Endo et al. | 524/318 |
| 5,252,650 A | 10/1993 | Wideman et al. | 524/318 |
| 5,306,772 A | 4/1994 | Mimura et al. | 525/92 |
| 5,474,604 A | 12/1995 | Demmering et al. | 106/38.24 |
| 5,652,310 A | 7/1997 | Hsu et al. | 525/331.9 |
| 6,057,392 A | 5/2000 | Wideman et al. | 524/318 |
| 6,239,203 B1 | 5/2001 | Sandstrom et al. | 524/385 |
| 6,532,718 B2 | 3/2003 | Rayman | 53/399 |
| 6,561,241 B2 | 5/2003 | Rayman | 152/209.1 |
| 6,824,485 B2 | 11/2004 | Edwards et al. | 474/260 |
| 6,884,832 B2 | 4/2005 | Wentworth et al. | 524/306 |
| 7,021,633 B2 | 4/2006 | Gorman | 277/549 |

FOREIGN PATENT DOCUMENTS

JP        56-128203       10/1981
JP        11-78415    *   3/1999

* cited by examiner

*Primary Examiner*—Justin Fischer
(74) *Attorney, Agent, or Firm*—John D. DeLong

(57) ABSTRACT

The present invention relates to a two piece pneumatic tire comprising a carcass and a removable tread belt disposed radially about the periphery of the carcass, the tread belt and carcass meeting at an interface between a radially outermost surface of the carcass and a radially innermost surface of the tread belt, wherein at least one of the radially outermost surface of the carcass and the radially innermost surface of the tread belt comprise a self lubricating rubber composition, the self lubricating rubber composition comprising at least one rubber and from 1 to 50 phr of at least one additive selected from alcohols of formula I, esters of formula II, or amides of formula III

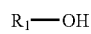
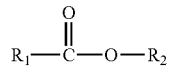
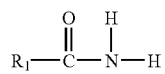

wherein $R_1$ and $R_2$ are independently selected from $C_{12}$-$C_{36}$ alkyl, $C_{12}$-$C_{36}$ alkenyl, or $C_{12}$-$C_{36}$ alkadienyl.

11 Claims, 2 Drawing Sheets

TWO-PIECE TIRE

CROSS REFERENCE TO RELATED APPLICATIONS

This application is a division of Ser. No. 11/020,889 filed Dec. 22, 2004 now U.S. Pat. No. 7,207,366.

BACKGROUND OF THE INVENTION

Two piece pneumatic tires having removable tread belts disposed over a tire carcass are generally designed for use on large earth mover vehicles and are subjected to high stress and loads under harsh environmental conditions such as in rock quarries, mines, foundries, and other areas where tires are subjected to puncture-producing and wear-inducing conditions. In particular, the rubber interface between the tread belt and the carcass may be subject to movement between the tread belt and carcass, which may lead to degradation at the interface.

SUMMARY OF THE INVENTION

The present invention relates to a two piece pneumatic tire comprising a carcass and a removable tread belt disposed radially about the periphery of the carcass, the tread belt and carcass meeting at an interface between a radially outermost surface of the carcass and a radially innermost surface of the tread belt, wherein at least one of the radially outermost surface of the carcass and the radially innermost surface of the tread belt comprise a self lubricating rubber composition, the self lubricating rubber composition comprising at least one rubber and from 1 to 50 phr of at least one additive selected from alcohols of formula I, esters of formula II, or amides of formula III

wherein $R_1$ and $R_2$ are independently selected from $C_{12}$-$C_{36}$ alkyl, $C_{12}$-$C_{36}$ alkenyl, or $C_{12}$-$C_{36}$ alkadienyl.

DETAILED DESCRIPTION OF THE INVENTION

Figure 1:
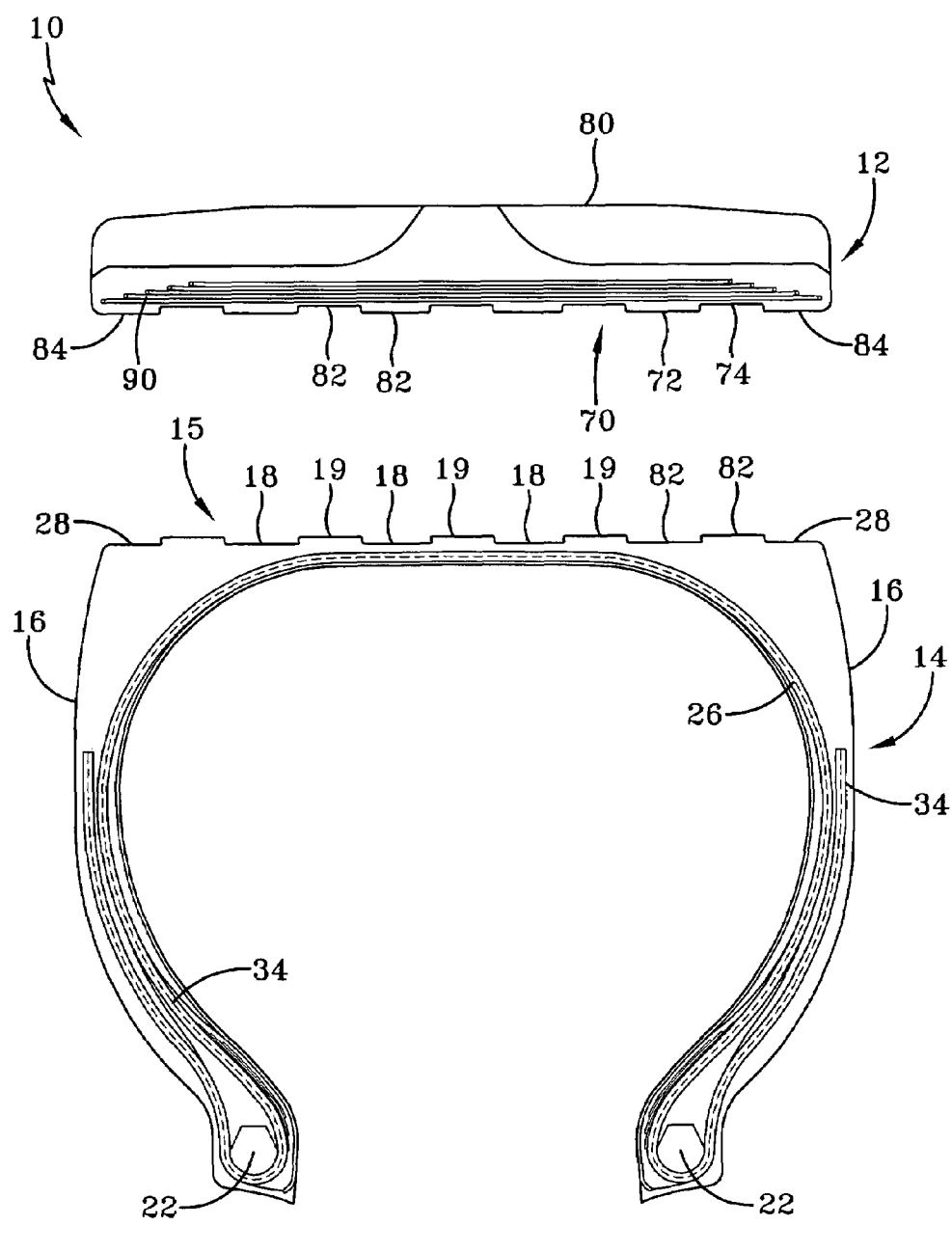
FIG.-1 shows an exploded cross sectional view of a two piece tire according to the present invention.

There is disclosed a two piece pneumatic tire comprising a carcass and a removable tread belt disposed radially about the periphery of the carcass, the tread belt and carcass meeting at an interface between a radially outermost surface of the carcass and a radially innermost surface of the tread belt, wherein at least one of the radially outermost surface of the carcass and the radially innermost surface of the tread belt comprise a self lubricating rubber composition, the self lubricating rubber composition comprising at least one rubber and from 1 to 50 phr of at least one additive selected from alcohols of formula I, esters of formula II, or amides of formula III

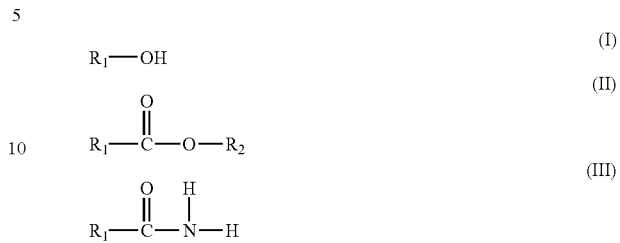

wherein $R_1$ and $R_2$ are independently selected from $C_{12}$-$C_{36}$ alkyl, $C_{12}$-$C_{36}$ alkenyl, or $C_{12}$-$C_{36}$alkadienyl.

In one embodiment, the rubber composition may include at least one alcohol of formula I $$R_1\text{—OH} \quad (I)$$

where $R_1$ is $C_{12}$-$C_{36}$ alkyl, $C_{12}$-$C_{36}$ alkenyl, or $C_{12}$-$C_{36}$ alkadienyl. In one embodiment, the alcohol may include 1-dodecanol (lauryl alcohol), 1-tetradecanol (myristyl alcohol), 1-hexadecanol (cetyl alcohol), 1-octadecanol (stearyl alcohol), 1-eicosanol (arachidyl alcohol), 1-docosanol (behenyl alcohol), 1-tetracosanol, 1-hexacosanol, 1-octaconsanol, 1-triacontanol (melissyl alcohol), 1-dotriacontanol, 1-tetratriacontanol and mixtures thereof. In one embodiment, the alcohol comprises 1-octadecanol.

One suitable octadecanol is commercially available from Procter & Gamble Chemicals under the designation CO-1895 Stearyl Alcohol. This product has a melting point of 58° C. and a G.C. Chain length distribution (percent by weight) of $C_{14}$, 0.1 percent; $C_{16}$, 1.3 percent; $C_{18}$, 95.5 percent; and $C_{20}$, 0.9 percent.

In one embodiment, the rubber composition may include at least one ester of formula II

where $R_1$ and $R_2$ are independently selected from $C_{12}$-$C_{36}$ alkyls. The esters may be produced by esterification of $C_{12}$-$C_{36}$ fatty acids with $C_{12}$-$C_{36}$ alcohols under suitable conditions as is known in the art. In one embodiment, the ester may be formed by reaction of the $C_{12}$-$C_{36}$ fatty acid with an aliphatic alcohol having from about 12 to about 36 carbon atoms under esterification conditions. In another embodiment, ester may be formed by reaction of a $C_{12}$-$C_{36}$ fatty acid with a dihydric or polyhydric alcohol, for example, glycerin, ethylene glycol, propylene glycol, pentaerythritol, and polyethylene glycol, and the like. In one embodiment, the ester may be a fatty acid ester of an aliphatic alcohol including dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, heneicosyl alcohol, docosyl alcohol or mixtures thereof. In one embodiment, the ester may be any of the dodecyl, tridecyl, tetradecyl, pentadecyl, hexadecyl, heptadecyl, octadecyl, nonadecyl, eicosyl, heneicosyl, or docosyl esters of any of stearic, oleic, palmitic, 9,12-linoleic, 9,11-linoleic (conjugated linoleic), pinolenic, eicosenoic, palmitoleic, magaric, octadecadienoic, or octadectrienoic acids. In one embodiment, the ester is a fatty acid ester of dodecyl alcohol, hexadecyl alcohol or octadecyl alcohol. In one embodiment, the ester comprises octadecyl octadecanoate (also known as stearyl stearate).

In one embodiment, the rubber composition may include at least one amide of the formula III

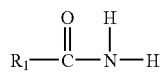

(III)

where $R_1$ is $C_{12}$-$C_{36}$ alkyl, $C_{12}$-$C_{36}$ alkenyl, or $C_{12}$-$C_{36}$ alkadienyl. In one embodiment, the amide may be an amide of a saturated or unsaturated monovalent amines, or saturated or unsaturated polyvalent amines, for example, caprylamine, laurylamine, palmitylamine, stearylamine, oleylamine, myristylamine, methylenediamine, ethylenediamine, hexamethylenediamine, and ammonia, and the like. In one embodiment, the amide may be caprylamide, laurylamide, palmitylamide, stearylamide, oleamide, myristylamide, and the like.

For ease in handling, the alcohol of formula I, ester of formula II, or amide of formula III may be used as is or may be deposited on suitable carriers. Examples of carriers which may be used in the present invention include silica, carbon black, alumina, kieselguhr, silica gel and calcium silicate.

In one embodiment, the rubber composition comprises from 1 to 50 parts by weight, per 100 parts by weight of rubber (phr), of the additive selected from alcohols of formula I, esters of formula II, and amides of formula III. In another embodiment, the rubber composition comprises from 2 to 25 phr of the additive selected from alcohols of formula I, esters of formula II, and amides of formula III.

In addition to the additive selected from alcohols of formula I, esters of formula II, and amides of formula III, the rubber composition contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled star-branched polymers. In one embodiment the rubber or elastomers are polybutadiene, SBR, and synthetic and natural polyisoprene.

In one embodiment, the rubber to be combined with the additive selected from alcohols of formula I, esters of formula II, and amides of formula III may be a blend of at least two diene based rubbers. In one embodiment, a blend of two or more rubbers may be used such as cis 1,4-polyisoprene rubber (natural or synthetic), emulsion and solution polymerization derived styrene butadiene rubbers, and cis 1,4-polybutadiene rubbers.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, alternatively about 9 to about 36, percent. The S-SBR can be conveniently prepared, for example, by organo lithium catalyzation in the presence of an organic hydrocarbon solvent.

The cis 1,4-polybutadiene rubber (BR) is considered to be beneficial for a purpose of enhancing the tire wear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition, conventional fillers may be also present. The amount of such conventional fillers may range from 10 to 250 phr. In one embodiment, the filler is present in an amount ranging from 20 to 100 phr.

The commonly employed siliceous pigments which may be used in the rubber compound include conventional pyrogenic and precipitated siliceous pigments (silica). In one embodiment precipitated silica is used. The conventional siliceous pigments that may be employed in this invention are in one embodiment precipitated silicas such as, for example, those obtained by the acidification of a soluble silicate, e.g., sodium silicate.

Such conventional silicas might be characterized, for example, by having a BET surface area, as measured using nitrogen gas, in one embodiment in the range of about 40 to about 600, and in another embodiment in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, N315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm$^3$/100 g.

In one embodiment the rubber composition for use in the tire component may additionally contain a sulfur containing organosilicon compound. Examples of suitable sulfur containing organosilicon compounds are of the formula:

Z-Alk-S$_n$-Alk-Z in which Z is selected from the group consisting of

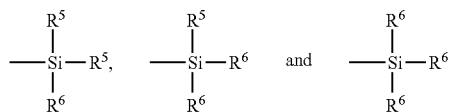

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3-bis(tri-2'''-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2'''-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment the sulfur containing organosilicon compounds are the 3,3'-bis(trimethoxy or triethoxy silylpropyl) sulfides. In one embodiment the compounds are 3,3'-bis(triethoxysilylpropyl) disulfide and 3,3'-bis(triethoxysilylpropyl) tetrasulfide. Therefore as to the above formula, in one embodiment Z is

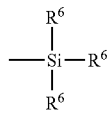

where $R^6$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur vulcanizing agent is elemental sulfur. The sulfur vulcanizing agent may be used in an amount ranging from 0.5 to 8 phr, with a range of from 1.5 to 6 phr being used in one embodiment. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, in another embodiment about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator is in one embodiment a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Figure 2:
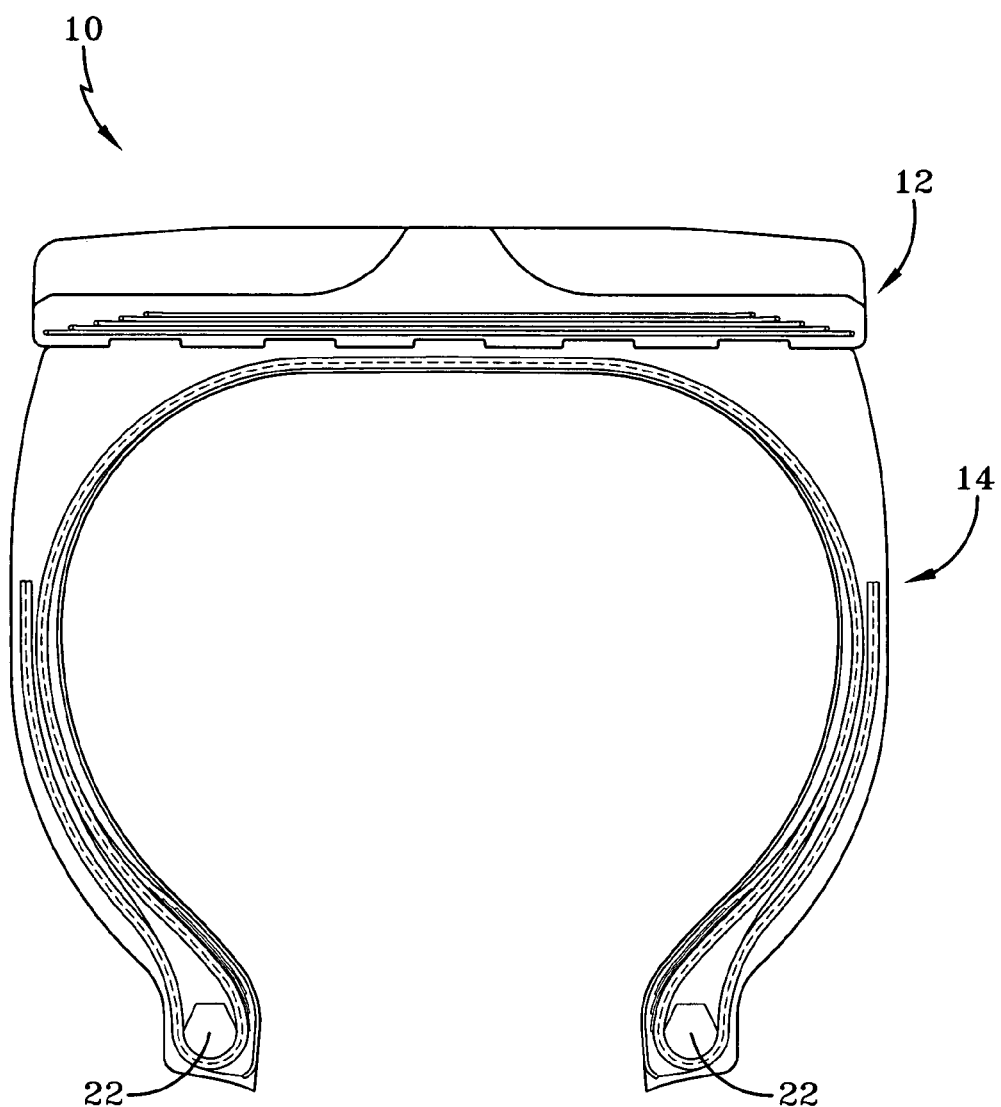
FIG.-2 shows a cross sectional view of a two piece tire according to the present invention.

With reference to FIGS. 1 and 2, there is illustrated a cross-section of one embodiment of a two-piece pneumatic tire 10. The self-lubricating rubber composition is used at the interface between tread belt 12 and tire carcass 14 of two piece tire 10. In one embodiment, tread belt 12 includes the self-lubricating rubber composition at radially innermost surface 70. In another embodiment, carcass 14 includes the self-lubricating rubber composition at radially outermost surface 15. In another embodiment, the self-lubricating rubber composition is included at surface 70 of tread belt 12 and at radially outermost surface 15 of carcass 14.

The carcass 14 includes a radially outer surface 15 having a plurality of lands 18 and grooves 19 for mating with aligned, opposing grooves 74 and lands 72 of tread belt 12. In one embodiment, the outermost radial surface 15 includes self-lubricating compound layer 82 for forming a surface between the tread belt 12 and the carcass 14.

The tire carcass 14 generally includes a pair of tire sidewalls 16 extending radially inwardly from the radially outermost circumferential surface 15 of the tire carcass and terminating at their radial extremities in a pair of bead wires 22.

The carcass further includes an inner ply liner 26 that serves to hold the air within the carcass that is used to inflate tire 10. The carcass 14 further includes in its construction at least one rubber laminated ply layer 34 of tire cord fabric and beads 22.

The ground engaging, circumferentially extending tread belt 12 is removably mountable onto tire carcass 14. The tire tread belt 12 may include a tread portion 80 on the outer radial surface for engagement with the ground, and belt package 90 comprising two or more belt layers. The underside or radially innermost circumference surface 70 of tread belt 12 comprises a plurality of annular lands 72 and grooves 74 that mate with corresponding aligned grooves 18 and lands 19 of tire carcass 14. In one embodiment, the inner circumference surface 70 includes self-lubricating compound layer 82 for forming a surface between the tread belt 12 and the carcass 14. The mating lands and grooves function to restrain belt 12 from lateral or axial movement with respect to the carcass 14. In particular, the mating grooves and lands in the shoulder regions 84, 28 are susceptible to high stress. Therefore, in one embodiment, the innermost radial surface 70 includes self-lubricating compound layer 82 in the shoulder area 84 of treadbelt 12. In another embodiment, the outermost radial surface 15 includes self-lubricating compound layer 82 in the shoulder area 28 of carcass 14. In another embodiment, both the innermost radial surface 70 in the shoulder area 84 of treadbelt 12 and the outermost radial surface 15 in the shoulder area 28 of carcass 14 include self-lubricating compound layer 82. In another embodiment, both the innermost radial surface 70 in the shoulder area 84 of treadbelt 12 and the outermost radial surface 15 in the shoulder area 28 of carcass 14 include self-lubricating compound layer 82, with the self lubricating compound layer 82 excluded from the non-shoulder regions of surfaces 70 and 15, or used having a lower concentration of the alcohol, ester, or amide additive in the non-shoulder regions than in the shoulder regions.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

The invention is further illustrated by the following non-limiting examples.

EXAMPLE I

In this Example, an alcohol of formula I and an ester of formula II were evaluated in a rubber composition containing carbon black.

Rubber compositions containing the materials set out in Table 1 were prepared using four separate stages of addition (mixing); namely three non-productive mix stages and one productive mix stage. The non-productive stages were mixed for four minutes to a rubber temperature of 160° C. The productive stage was mixed for two minutes, and the drop temperature for the productive mix stage was 115° C.

The rubber compositions are identified as Sample A-H. Samples A, D, E and H are considered as controls due to the absence of the alcohol or ester.

The Samples were cured at about 150° C. for about 32 minutes.

Table 2 illustrates the physical properties of the cured Samples A through H.

The coefficient of friction (COF) test is done according to ASTM D-1894 on a Model SP-2000 Slip/Peel Tester from IMASS Inc. Samples are tested at 6 inches per minute using a 200 g sled. The COF is measured against a polished aluminum surface.

TABLE 1

| Sample | Control A | B | C | Control D | Control E | F | G | Control H |
|---|---|---|---|---|---|---|---|---|
| Non Productive Stage 1 | | | | | | | | |
| Natural Rubber | 80 | 80 | 80 | 80 | 80 | 80 | 80 | 80 |
| Carbon black | 12 | 12 | 12 | 12 | 12 | 12 | 12 | 12 |
| Wax | 0.4 | 0.4 | 0.4 | 0.4 | 0.4 | 0.4 | 0.4 | 0.4 |
| Fatty Acid | 2 | 2 | 2 | 2 | 2 | 2 | 2 | 2 |
| Zinc Oxide | 3 | 3 | 3 | 3 | 3 | 3 | 3 | 3 |
| Stearyl stearate | 0 | 2.5 | 5 | 0 | 0 | 0 | 0 | 0 |
| Aromatic oil | 0 | 0 | 0 | 2.5 | 5 | 0 | 0 | 0 |
| Octadecanol | 0 | 0 | 0 | 0 | 0 | 2.5 | 5 | 0 |
| Non Productive Stage 2 | | | | | | | | |
| polybutadiene | 20 | 20 | 20 | 20 | 20 | 20 | 20 | 20 |
| Carbon black | 10 | 10 | 10 | 10 | 10 | 10 | 10 | 10 |
| Silica | 7 | 7 | 7 | 7 | 7 | 7 | 7 | 7 |
| Non Productive Stage 3 | | | | | | | | |
| carbon black | 13 | 13 | 13 | 13 | 13 | 13 | 13 | 13 |
| Antioxidant | 1 | 1 | 1 | 1 | 1 | 1 | 1 | 1 |
| Silane Coupler | 3 | 3 | 3 | 3 | 3 | 3 | 3 | 3 |
| Productive Stage | | | | | | | | |
| Antioxidant | 0.5 | 0.5 | 0.5 | 0.5 | 0.5 | 0.5 | 0.5 | 0.5 |
| Zinc Oxide | 1 | 1 | 1 | 1 | 1 | 1 | 1 | 1 |
| Sulfur | 1.9 | 1.9 | 1.9 | 1.9 | 1.9 | 1.9 | 1.9 | 1.9 |
| Accelerator | 1.35 | 1.35 | 1.35 | 1.35 | 1.35 | 1.35 | 1.35 | 1.35 |

TABLE 2

| | A | B | C | D | E | F | G | H |
|---|---|---|---|---|---|---|---|---|
| RPA500 | | | | | | | | |
| Uncured G' | 142 | 131 | 127 | 139 | 129 | 132 | 122 | 155 |
| Cured G' 10% Strain | 1546 | 1427 | 1331 | 1479 | 1412 | 1443 | 1345 | 1574 |
| Cured TD 10% Strain | 0.061 | 0.059 | 0.053 | 0.054 | 0.057 | 0.054 | 0.05 | 0.055 |
| Rheometer, 150 C. | | | | | | | | |
| Max Torq | 20.98 | 19.65 | 18.3 | 19.93 | 19.2 | 19.41 | 18.35 | 20.85 |
| Min Torq | 1.89 | 1.73 | 1.69 | 1.83 | 1.76 | 1.77 | 1.61 | 2.02 |
| Delta Torq | 19.09 | 17.92 | 16.61 | 18.1 | 17.44 | 17.64 | 16.74 | 18.83 |
| T90 | 10.34 | 10.56 | 10.76 | 10.81 | 11.25 | 10.25 | 9.85 | 10.48 |
| Stress-Strain, cured 32 minutes at 150 C. | | | | | | | | |
| Tens Strength | 21.63 | 23.11 | 23.93 | 23.23 | 22.46 | 22.8 | 23.2 | 24.57 |
| Elong Break | 406 | 443 | 468 | 448 | 455 | 439 | 460 | 442 |
| M300 | 15.14 | 14.14 | 13.34 | 13.96 | 12.99 | 14.08 | 13.27 | 15.15 |
| Hardness, cured 32 minutes at 150 C. | | | | | | | | |
| RT | 66 | 65 | 64 | 63 | 63 | 65 | 64 | 65 |
| 100 C. | 62 | 61 | 58 | 60 | 59 | 60 | 58 | 61 |
| Rebound, cured 32 minutes at 150 C. | | | | | | | | |
| RT | 63 | 62 | 61 | 63 | 62 | 62 | 60 | 64 |
| 100 C. | 73 | 74 | 74 | 74 | 73 | 74 | 74 | 74 |
| Tear Strength 32/150 C. | | | | | | | | |
| 95 C., N | 36 | 47 | 53 | 44 | 49 | 43 | 49 | 36 |
| Tear Strength 32/150 C. | | | | | | | | |
| 23 C., N | 143 | 166 | 181 | 181 | 236 | 168 | 178 | 168 |
| DIN Abrasion 32/150 C. | | | | | | | | |
| Relative loss | 105 | 91 | 85 | 105 | 108 | 79 | 60 | 95 |
| Coefficient of Friction | | | | | | | | |
| Value | 2.86 | 2.38 | 2.17 | 2.87 | 2.79 | 2.23 | 1.59 | 2.71 |

It can be seen from Table 2 that use of stearyl stearate or stearyl alcohol resulted in reduced coefficient of friction as compared with use of aromatic oil or no additive. In addition, the use of stearyl stearate or stearyl alcohol results in improved abrasion resistance as compared with the controls.

EXAMPLE II

In this Example, two amides of formula III were evaluated in a rubber composition containing carbon black.

Rubber compositions containing the materials set out in Table 3 were prepared using four separate stages of addition (mixing); namely three non-productive mix stages and one productive mix stage. The non-productive stages were mixed for four minutes to a rubber temperature of 160° C. The productive stage was mixed for two minutes, and the drop temperature for the productive mix stage was 115° C.

The rubber compositions are identified as Samples I-P. Samples I, L, M and P are considered as controls due to the absence of the amide.

The Samples were cured at about 150° C. for about 32 minutes.

Table 4 illustrates the physical properties of the cured Samples I through P.

The coefficient of friction (COF) test is done according to ASTM D-1894 on a Model SP-2000 Slip/Peel Tester from IMASS Inc. Samples are tested at 6 inches per minute using a 200 g sled. The COF is measured against a polished aluminum surface.

TABLE 3

|  | Control I | J | K | Control L | Control M | N | O | Control P |
|---|---|---|---|---|---|---|---|---|
| Non Productive Mix Stage | | | | | | | | |
| Natural Rubber | 100 | 100 | 100 | 100 | 70 | 70 | 70 | 70 |
| polybutadiene | 0 | 0 | 0 | 0 | 12 | 12 | 12 | 12 |
| E-SBR | 0 | 0 | 0 | 0 | 18 | 18 | 18 | 18 |
| Carbon black | 50 | 50 | 50 | 50 | 50 | 50 | 50 | 50 |
| Fatty Acid | 2 | 2 | 2 | 2 | 2 | 2 | 2 | 2 |
| Zinc Oxide | 5 | 5 | 5 | 5 | 5 | 5 | 5 | 5 |
| Antioxidant | 2 | 2 | 2 | 2 | 2 | 2 | 2 | 2 |
| Stearamide | 0 | 5 | 0 | 0 | 0 | 5 | 0 | 5 |
| Oleamide | 0 | 0 | 5 | 0 | 0 | 0 | 5 | 0 |
| Processing Oil | 5 | 0 | 0 | 5 | 5 | 0 | 0 | 5 |
| Productive Mix Stage | | | | | | | | |
| Sulfur | 1.4 | 1.4 | 1.4 | 1.4 | 1.4 | 1.4 | 1.4 | 1.4 |
| Accelerator | 1 | 1 | 1 | 1 | 1 | 1 | 1 | 1 |

TABLE 4

| | | | | | | | | |
|---|---|---|---|---|---|---|---|---|
| RPA500 | | | | | | | | |
| Unc G' | 190 | 181 | 184 | 195 | 204 | 174 | 192 | 183 |
| Cured G' 10% Strain | 1351 | 1370 | 1339 | 1374 | 1474 | 1471 | 1434 | 1418 |
| Cured TD 10% Strain | 0.102 | 0.097 | 0.098 | 0.104 | 0.105 | 0.09 | 0.103 | 0.105 |
| Rheometer 150 C. | | | | | | | | |
| Max Torq | 16.68 | 17.79 | 17.32 | 16.66 | 17.71 | 17.83 | 18.01 | 17.25 |
| Min Torq | 2.6 | 2.53 | 2.62 | 2.55 | 2.62 | 2.37 | 2.63 | 2.47 |
| Delta Torq | 14.08 | 15.26 | 14.7 | 14.11 | 14.55 | 15.46 | 15.38 | 14.78 |
| T90 | 12.15 | 6.79 | 6.81 | 11.93 | 16.61 | 8.72 | 8.32 | 16.2 |
| Stress-Strain 32/150 C. | | | | | | | | |
| Tens Strength | 24 | 24.2 | 24.8 | 23.2 | 22.5 | 22.6 | 23.1 | 22.5 |
| Elong Break | 482 | 450 | 486 | 473 | 462 | 432 | 460 | 464 |
| M300 | 12.8 | 15.2 | 13.5 | 12.8 | 13 | 14.8 | 13.7 | 13 |
| Hardness 32/150 C. | | | | | | | | |
| RT | 64 | 69 | 66 | 64 | 67 | 71 | 68 | 66 |
| 100 C. | 58 | 58 | 57 | 58 | 60 | 60 | 60 | 60 |
| Rebound 32/150 C. | | | | | | | | |
| RT | 49 | 46 | 44 | 48 | 48 | 45 | 43 | 47 |
| 100 C. | 62 | 64 | 63 | 61 | 60 | 61 | 61 | 60 |
| Tear Strength 32/150 C. | | | | | | | | |
| 95 C.,N | 195 | 145 | 162 | 175 | 119 | 95 | 103 | 109 |
| Tear Strength 32/150 C. | | | | | | | | |
| 95 C., N, Aged | 136 | 96 | 137 | 121 | 69 | 61 | 76 | 69 |
| DIN Abrasion 32/150 C. | | | | | | | | |
| Relative loss | 149 | 120 | 121 | 156 | 121 | 104 | 93 | 112 |
| Coefficient of Friction | | | | | | | | |
| Value | 3.22 | 2.61 | 1.9 | 3.41 | 3.26 | 1.58 | 1.35 | 2.97 |

It can be seen from Table 4 that use of stearamide or oleamide resulted in reduced coefficient of friction as compared with use of processing oil or no additive. In addition, the use of stearamide or oleamide results in improved abrasion resistance as compared with the controls.

While certain representative embodiments and details have been shown for the purpose of illustrating the invention, it will be apparent to those skilled in this art that various changes and modifications may be made therein without departing from the spirit or scope of the invention.

The invention claimed is:

1. A two piece pneumatic tire comprising a carcass and a removable tread belt disposed radially about the periphery of the carcass, the tread belt and carcass meeting at an interface between a radially outermost surface of the carcass and a radially innermost surface of the tread belt, the radially outermost surface of the carcass and the radially innermost surface of the tread belt extending axially between two shoulders, wherein the radially outermost surface of the carcass comprises a self lubricating rubber composition, the self lubricating rubber composition comprising at least one rubber and from 1 to 50 phr of at least one alcohol of formula III $$R_1\text{---OH} \tag{I}$$

wherein $R_1$ is selected from $C_{12}$-$C_{36}$ alkyl, $C_{12}$-$C_{36}$ alkenyl, or $C_{12}$-$C_{36}$ alkadienyl; wherein the self-lubricating rubber composition is disposed axially proximate to a shoulder of the tire and is excluded from the radially outermost surface of the carcass axially distal to both shoulders.

2. The pneumatic tire of claim 1 wherein the radially outermost surface of the carcass and the radially innermost surface of the tread belt each comprise a plurality of mating lands and grooves that function to restrain the tread belt from lateral or axial movement with respect to the carcass.

3. The pneumatic tire of claim 1 wherein the at least one alcohol comprises 1-octadecanol.

4. The pneumatic tire of claim 1 wherein the self lubricating rubber composition further comprises 10 to 250 phr of a filler selected from carbon black and silica.

5. The pneumatic tire of claim 4 wherein said filler comprises silica.

6. The pneumatic tire of claim 4 wherein said filler comprises carbon black.

7. The pneumatic tire of claim 4 wherein the self lubricating rubber composition further comprises from 0.5 to 20 phr of a sulfur containing organosilicon compound of the formula:

$$\text{Z-Alk-S}_n\text{-Alk-Z}$$

in which Z is selected from the group consisting of

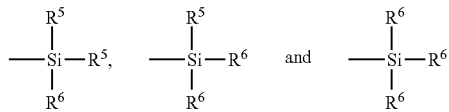

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

8. The pneumatic tire of claim 7 wherein said self lubricating rubber composition is thermomechanically mixed at a rubber temperature in a range of from 140° C. to 190° C. for a total mixing time of from 1 to 20 minutes.

9. The pneumatic tire of claim 1 wherein the rubber is selected from the group consisting of polybutadiene, styrene-butadiene rubber, synthetic polyisoprene, and natural polyisoprene.

10. The pneumatic tire of claim 1 wherein the at least one alcohol is present in an amount ranging from 2 to 25 phr.

11. The pneumatic tire of claim 1 wherein the at least one alcohol is selected from 1-dodecanol(lauryl alcohol), 1-tetradecanol(myristyl alcohol), 1-hexadecanol(cetyl alcohol), 1-octadecanol(stearyl alcohol), 1-eicosanol(arachidyl alcohol), 1-docosanol(behenyl alcohol), 1-tetracosanol, 1-hexacosanol, 1-octaconsanol, 1-triacontanol (melissyl alcohol), 1-dotriacontanol, and 1-tetratriacontanol.

* * * * *